(12) United States Patent
Chenowth

(10) Patent No.: US 9,887,536 B2
(45) Date of Patent: Feb. 6, 2018

(54) SELF-CORRECTING DRIVE AND MOTOR CONTROL FOR CARGO CANOPY SYSTEMS

(71) Applicant: Rory H. Chenowth, Ramona, CA (US)

(72) Inventor: Rory H. Chenowth, Ramona, CA (US)

( * ) Notice: Subject to any disclaimer, the term of this patent is extended or adjusted under 35 U.S.C. 154(b) by 24 days.

(21) Appl. No.: 14/415,565

(22) PCT Filed: Jul. 19, 2013

(86) PCT No.: PCT/US2013/051395
§ 371 (c)(1),
(2) Date: Jan. 16, 2015

(87) PCT Pub. No.: WO2014/015317
PCT Pub. Date: Jan. 23, 2014

(65) Prior Publication Data
US 2015/0188481 A1 Jul. 2, 2015

Related U.S. Application Data

(63) Continuation of application No. 13/840,530, filed on Mar. 15, 2013, now Pat. No. 9,136,694, which is a
(Continued)

(51) Int. Cl.
*H02H 7/00* (2006.01)
*H02H 7/085* (2006.01)
(Continued)

(52) U.S. Cl.
CPC ............ *H02H 7/0855* (2013.01); *B60J 7/068* (2013.01); *B60J 7/085* (2013.01); *B60P 7/02* (2013.01);
(Continued)

(58) Field of Classification Search
CPC .... H02H 7/0855; H02H 7/085; H02P 29/032; H02P 29/028; B60J 7/068; B60J 7/085; B60P 7/02; B60P 7/04; F16H 31/004
(Continued)

(56) References Cited

U.S. PATENT DOCUMENTS 3,633,073 A * 1/1972 Day, III ............... H02H 7/0857
361/22
5,186,231 A * 2/1993 Lewis ...................... B60J 7/068
160/264
(Continued)

*Primary Examiner* — Joseph D Pape
(74) *Attorney, Agent, or Firm* — Miller Canfield

(57) ABSTRACT

In the coupling of bi-directional, non-freewheeling-type DC motors (24,25) to the pulling spool (23) of a canopy (11) deployment strap (21,22) and to a take-up roller (15), ratchet gears (26,27) assure automatic alignment and synchronization of the deployment and retraction mechanisms. The reverse direction rotation of the unwinding motor can be uninhibited through the slipping of its ratchet gear when the winding motor is slow to take up the pulling strap or the tarp (11) being wound thereon. The slipping provides sufficient slack to accommodate changes of spool and roller diameters as more material is successively wound thereon. A friction brake acting against a flange of die spool keeps it from spinning freely when not engaged by the motor. Winding motors can be protected against excessive power use by measuring the level of drawn current with a digital ammeter. If the current exceeds a threshold level of operation, a timer is started. As soon as a given absolute safe period of operation is surpassed, a breaker switch is tripped interrupting the motor power supply. A plural number of trip points can be programmed into the device.

17 Claims, 9 Drawing Sheets

Related U.S. Application Data continuation-in-part of application No. 13/553,261, filed on Jul. 19, 2012, now Pat. No. 8,752,881.

(51) Int. Cl.
    *B60P 7/02*          (2006.01)
    *H02P 29/028*      (2016.01)
    *B60J 7/06*          (2006.01)
    *B60P 7/04*          (2006.01)
    *F16H 31/00*       (2006.01)
    *B60J 7/08*          (2006.01)
    *H02P 29/032*      (2016.01)
    *H02P 31/00*       (2006.01)

(52) U.S. Cl.
    CPC ............ *B60P 7/04* (2013.01); *F16H 31/004* (2013.01); *H02H 7/085* (2013.01); *H02P 29/028* (2013.01); *H02P 29/032* (2016.02); *H02P 31/00* (2013.01); *Y10T 74/1523* (2015.01)

(58) Field of Classification Search
    USPC ................. 296/98, 100.11; 307/9.1, 10.1
    See application file for complete search history.

(56) References Cited

U.S. PATENT DOCUMENTS

| | | | |
|---|---|---|---|
| 2007/0103822 A1* | 5/2007 | Bilac | H02H 6/00 361/32 |
| 2010/0219656 A1* | 9/2010 | Chenowth | B60J 7/068 296/98 |

* cited by examiner

SELF-CORRECTING DRIVE AND MOTOR CONTROL FOR CARGO CANOPY SYSTEMS

PRIOR APPLICATION

This is a continuation of U.S. patent application Ser. No. 13/840,530, filed 2013 Mar. 15, incorporated herein by reference, which is a continuation-in-part of co-pending U.S. patent application Ser. No. 13/553,261, filed 2012 Jul. 19 incorporated herein by reference.

FIELD OF THE INVENTION

The instant invention relates to contractible canopy deployment mechanisms such as those used for retractable tarp covers commonly used to temporarily cover over the open-topped cargo compartments of vehicles, and more specifically relates to overload circuit breakers and the protection of electrical motors used in the deployment and retraction of cargo compartment canopies.

BACKGROUND

Vehicle cargo compartments for transporting bulk materials such as dirt, sand, grass clippings and the like are often covered with a canopy, often called a tarpaulin or tarp, during travel in order to avoid blowing out part of the load and thus creating a hazardous condition on the highway or contaminating the surroundings, or to prevent the load from getting wet. The deployed tarp needs to be held in place tightly to avoid being dislodged by the wind. Then the compartment needs to be uncovered to unload and load the bulk materials. The repeated and proper covering and uncovering of the compartment can be time-consuming.

Many different types of canopy deployment systems are available such as boom systems as disclosed in Petretti, U.S. Pat. No. 4,082,347, slider systems as disclosed in Merlot et al., U.S. Pat. No. 5,080,423, and side-rolling systems such as disclosed in Odegaard, U.S. Pat. No. 4,834,445 which deploys and retracts in a sideways manner from a double-wound laterally translating central roller. In the deployed configuration the roller is situated to span front-to-back over the middle of the open top of the compartment thus providing a middle support for the flexible canopy. The system in Odegaard uses an hydraulic motor to drive the deployment of the sheltering canopy off of the roller, and to drive retraction of the canopy back onto the roller. One advantage of hydraulic motors is that they are easily controlled in the forward and reverse direction by adjusting the pressure of the supplied fluid. However, hydraulic motors can have complex controls and be costly to manufacture, install and maintain. Further, leaking hydraulic fluid can contaminate other systems, cargo and the environment.

Some canopy systems use air driven motors. However such systems can be difficult to install and maintain due to lack of familiarity by operators. Further, some canopy systems are designed to tap into the existing vehicle air system operating the vehicle air brakes. Problems with the canopy air system can lead to more serious and potentially dangerous problems involving the vehicle brakes.

Some systems, such as the one disclosed in Eggers et al., U.S. Pat. No. 6,857,682, use a relatively inexpensive electric motor conveniently driven by the vehicle electrical system which typically operates using direct current (DC) and relatively low voltages of between about 12 VDC and about 24 VDC.

Often to reduce the cost of an electrical drive system, the type of electric motor selected will fall within a fairly narrow range of performance characteristics. This can be problematic in the cargo canopy field which is subject to changing conditions, harsh environments and rugged treatment. For example, the canopy mechanism can be impeded by obstacles protruding from the cargo or the accumulation of rust or debris throughout its various components. A frustrated operator may repeatedly activate the deployment and retraction motors in attempting to free the jammed mechanism or forcibly clear the obstacle. This puts great strain on the motors at the risk of burning their windings. Further, electrical systems operating in a hot, desert environment may tend to overheat more quickly then those operating in a cooler environment. In addition, a cargo canopy activating motor should be able to withstand a short burst of high current to deliver the torque necessary to overcome a temporary resistance without causing damage to the motor.

Thus, there can be great variation in the performance characteristics required by electric motors used by a system and their potential for early burnout may vary greatly. Although more rugged electric motors having wider performance characteristics are available, they tend to be more costly.

Exacerbating the problem, because of weight and cost concerns, electrical wire of no thicker than #6 gauge is often used in vehicle runs that can be in the tens of meters in length where DC electrical resistance becomes a large factor. Thus, higher DC currents are often used and, over time, there can be high power consumption, leading to the greater potential for motor burnout.

Installing a current sensitive circuit breaker or fuse between the source of electrical power and the motors has been the conventional way of protecting them. However, a circuit breaker responds mainly to the amplitude of the current drawn by the motors not necessarily to the amount of consumed power that might overheat the motor and damage the windings.

Fuses tend to respond somewhat better to the power consumed, namely blowing more quickly when the current is higher and more slowly when the current is lower. For example, a typical new 50 ampere fuse can blow within 10 seconds when the current passing through it is 160 amperes, but can take 40 seconds to blow when the current is 110 ampere.

Unfortunately, fuses can be more difficult, costly and time-consuming to replace. Furthermore, over time, a fuse will weaken so that eventually the fuse may blow when the power consumption is within acceptable limits. A frustrated operator may then decide to electrically bypass the fuse thus greatly increasing the risk of motor burnout and the potential for dangerous electrical shorts.

In some systems there is a dedicated motor for deployment actions and a separate motor to drive retraction actions. Using two or more motors thus makes the cost of a particular motor more important to the overall cost of the system.

Some canopy retracting mechanisms previously available are prone to erratic operation due to misalignment of canopy edges, uneven stretching of the canopy fabric, lack of synchronization between driving motors or the jamming of pulling and guiding components. Moreover, the canopy deploying and retracting motors need to be well balanced and relatively precise in order to assure a smooth operation of the mechanism under the rugged, all-weather conditions typical for cargo vehicles. For stability and exactness of alignment, prior mechanisms have been proposed which require complex boom and lever structures as disclosed in PCT International Publication WO 2005/005186 Hines.

In addition, as material is wound upon a roller or spool its effective diameter changes due to the material already wound on the spool. Thus, it can be difficult to predict the amount of material taken up for any given rotation. This can lead to uneven tensioning on the material which in turn can lead to misalignment.

Unfortunately because of the rugged environment and particular cost concerns of the cargo canopy field, those electrical and mechanical systems which work in a seemingly similar field such as retractable awnings may not provide any useful guidance for designs in the cargo canopy field.

The instant invention results from efforts to address one or more of the above problems with prior cargo canopy systems.

SUMMARY

The primary and secondary objects of the invention are to provide an improved container cover deployment and retraction system. These and other objects are achieved by a novel canopy deployment an retraction system particularly adapted to the use of one or more inexpensive electrical motors.

In some embodiments there is provided a protective device for an electrical motor driving the deployment or the retraction of a cargo compartment canopy which measures the actual energy drawn by the motor in terms of current and time.

In some embodiments there is provided a simplified and adjustable mechanism for protecting cargo canopy system motors from overload based on energy drawn.

In some embodiments the power supply is interrupted when a preset energy limit is reached. In some embodiments the device monitors the amplitude of the current and accumulates the time of motor activity. In some embodiments a circuit breaker is tripped when a time limit associated with the measured current is reached.

In some embodiments a plurality of time limits for various measured threshold currents is provided. In some embodiments the time limits and threshold current parameters are programmable.

In some embodiments there is provided a method for disabling an electrical motor when the amount of energy consumed by the motor exceeds a preset limit, said method comprising the steps of: assigning a plurality of threshold amperages of an electric current drawn by the motor; setting a time duration limit for each of said plurality of threshold amperages; measuring the amperage of the current drawn by the motor to get a measured current; detecting that said measured current has exceeded a first one of said threshold amperages and not exceeded a next larger one of said threshold amperages; accumulating the time said measured current is drawn; and, interrupting a supply of said current when said limit for said first one of said threshold amperages is reached.

In some embodiments said step of setting comprises: procuring a time-versus-current function expressing the maximum time values of excessive current that may be safely drawn by said motor; and, wherein said step of interrupting comprises: switching off said motor when a maximum time of flow for a measured current exceeds a corresponding maximum time value given by said function.

In some embodiments the method further comprises: comparing said amperage to a preset maximum current limit; and switching off said motor when said limit is exceeded.

In some embodiments said measuring occurs continuously.

In some embodiments the method further comprises: subsequently detecting that said measured current exceeds said next larger one of said threshold amperages; and, interrupting said supply when said limit for said next larger one of said threshold amperages reached without resetting said accumulated time.

In some embodiments the method further comprises programming a microprocessor for performing said measuring, setting, accumulating and interrupting.

In some embodiments said programming further comprises: assigning at least three of said plurality of threshold amperages from a continuous range of selectable amperages falling between a minimum current for possible cutoff and a maximum allowable current.

In some embodiments the method said motor is used to translate a canopy over a cargo compartment.

In some embodiments the method further comprises: said motor being a first non-freewheeling motor driving a spool winding up a strap secured to the leading edge of the canopy; a second non-freewheeling motor driving a canopy take-up roller; and, coupling said first motor to said spool via a first ratcheting gear.

In some embodiments the method further comprises coupling said second motor to said roller via a second ratcheting gear.

In some embodiments the method further comprises performing a braking action upon the spool.

In some embodiments the method further comprises running the first motor is run in reverse rotation during retraction of the canopy.

In some embodiments the method further comprises said first ratchet gear intermittently disengaging the spool from the first motor during reverse rotation as the canopy is being retracted.

In some embodiments the method further comprises running the second motor is run in reverse rotation during deployment of the canopy.

In some embodiments the method further comprises said second ratchet gear intermittently disengaging the second motor during reverse rotation as the canopy is being deployed.

In some embodiments the roller is connected to a median portion of the canopy and is rotated to take up and wind together both straddling sections of the canopy; and said mechanism further comprises: a track spanning one end of the cargo area, said track supporting the second motor; and, a motor-stabilizing torque arm riding on said track.

In some embodiments the method further comprises: said strap being a first strap which comprises: a first distal portion connected to said leading edge; and a first proximal portion wound-up on said spool; and, a second strap which comprises: a second distal portion connected to said leading edge; and a second proximal portion wound-up on said spool.

In some embodiments the method further comprises winding each of said first and second straps upon separate cooperating reels of said spool.

In some embodiments there is provided a canopy deployment and retraction drive mechanism for cargo vehicles which comprises: a flexible sheet canopy deployably and retractably wound upon a roller spanning an open topped cargo compartment; a spool winding up a strap secured to the leading edge of the canopy; a first non-free-wheeling motor; and, a first ratcheting gear coupling the first motor to the spool; and an energy limiting device interrupting power to said first motor after a preset maximum amount of energy has been continuously drawn by said first motor.

In some embodiments there is provided in an installation controlling the operation of a motor driving a mechanism for deploying or retracting a protective canopy over the cargo compartment, an improvement for protecting the motor windings against excessive power use comprises: a digital ammeter substantially continuously measuring the level of electrical current drawn by said motor; means for determining when said current reaches a threshold level of operation; a timer accumulating the time period the current remains at said threshold level; and means for tripping a cutoff switch as soon as a given absolute safe period of operation is surpassed.

In some embodiments there is provided a system for coupling the pulling, deployment spool of a canopy system to its drive motor using a ratchet gear.

In some embodiments there is provided a system which assures precise and trouble-free operation of canopy deployment and retraction mechanism for a cargo compartment using relatively inexpensive, yet highly reliable, low-voltage, DC motors which can be more easily installed and maintained.

In some embodiments a pair of bi-directional, non-free-wheeling DC motors are coupled respectively to the pulling spool of a canopy deploying cable or strap and to the tarp take-up roller using ratchet gears.

In some embodiments the result is automatic alignment and synchronization of the deployment and retraction mechanism.

In some embodiments the ratchet gears are single-indentation ratchet gears.

In some embodiments the ratchet gears provide sufficient slack to accommodate changes of spool and roller diameters as the pulling strap or the tarp is wound-up thereupon.

In some embodiments a frictional brake is continuously apply to the spool to avoid uncontrolled spinning.

In some embodiments there is provided a mechanism for deploying and retracting a flexible sheet canopy over a cargo area wherein a canopy-deploying first motor is used to drive a spool winding up a strap secured to the leading edge of the canopy, and a canopy-retracting second motor is used to drive a take-up roller, including an improvement for avoiding erratic movement of the canopy, said improvement comprising a first ratcheting gear coupling the first motor to the spool.

In some embodiments the improvement further comprises a second ratcheting gear coupling the second motor to the roller.

In some embodiments the improvement further comprises a brake acting upon the spool.

In some embodiments the brake comprises at least one spring-biased member frictionally and continuously applied to the spool.

In some embodiments the spool comprises a lateral flange, and said member is applied to the flange.

In some embodiments the first motor is run in reverse rotation during retraction of the canopy.

In some embodiments the first ratchet gear intermittently disengages the spool from the first motor during reverse rotation as the canopy is being retracted.

In some embodiments the second motor is run in reverse rotation during deployment of the canopy.

In some embodiments the second ratchet gear intermittently disengages the second motor during reverse rotation as the canopy is being deployed.

In some embodiments the first ratchet gear comprises: a first wheel having at least one indentation; and, a spring-biased first pawl engaging said indentation in a forward movement of said first ratchet gear and sliding over said indentation in a reverse movement of said first ratchet gear.

In some embodiments the second ratchet gear comprises: a second wheel having at least one indentation; and, a spring-biased second pawl engaging said indentation in a forward movement of said second ratchet gear and sliding over said indentation in a reverse movement of said second ratchet gear.

In some embodiments the first ratchet gear comprises a wheel having a single indentation engageable by a pawl in the absence of any other indentation, allowing potentially free forward canopy-deploying rotation of the first motor over approximately 360 degrees.

In some embodiments the second ratchet gear comprises a wheel having a single indentation engageable by a pawl in the absence of any other indentation, allowing potentially free forward canopy-retracting rotation of the second motor over approximately 360 degrees.

In some embodiments the roller is connected to a median portion of the canopy and is rotated to take up and wind together both straddling sections of the canopy; and said mechanism further comprises: a track spanning one end of the cargo area, said track supporting the second motor; and a motor-stabilizing torque arm riding on said track.

In some embodiments the improvement further comprises: said strap being a first strap which comprises: a first distal portion connected to said leading edge; and a first proximal portion wound-up on said spool; and, a second strap which comprises: a second distal portion connected to said leading edge; and a second proximal portion wound-up on said spool.

In some embodiments each of said first and second straps are wound upon separate cooperating reels of said spool.

In some embodiments each of said motors is a non-freewheeling-type motor.

In some embodiments the motors are electric, non-free-wheeling motors.

In some embodiments the motors are air-driven motors.

In some embodiments the improvement further comprises an energy limiting device interrupting power to said first motor after a preset maximum amount of energy has been continuously drawn by said first motor.

In some embodiments there is provided a canopy deployment and retraction mechanism for cargo vehicles comprises: a flexible sheet canopy deployably and retractably wound upon a roller spanning an open topped cargo compartment; a spool winding up a strap secured to the leading edge of the canopy; a first non-free-wheeling motor; and, a first ratcheting gear coupling the first motor to the spool.

The content of the original claims is incorporated herein by reference as summarizing features in one or more exemplary embodiments.

DESCRIPTION OF THE EXEMPLARY EMBODIMENTS

Figure 1:
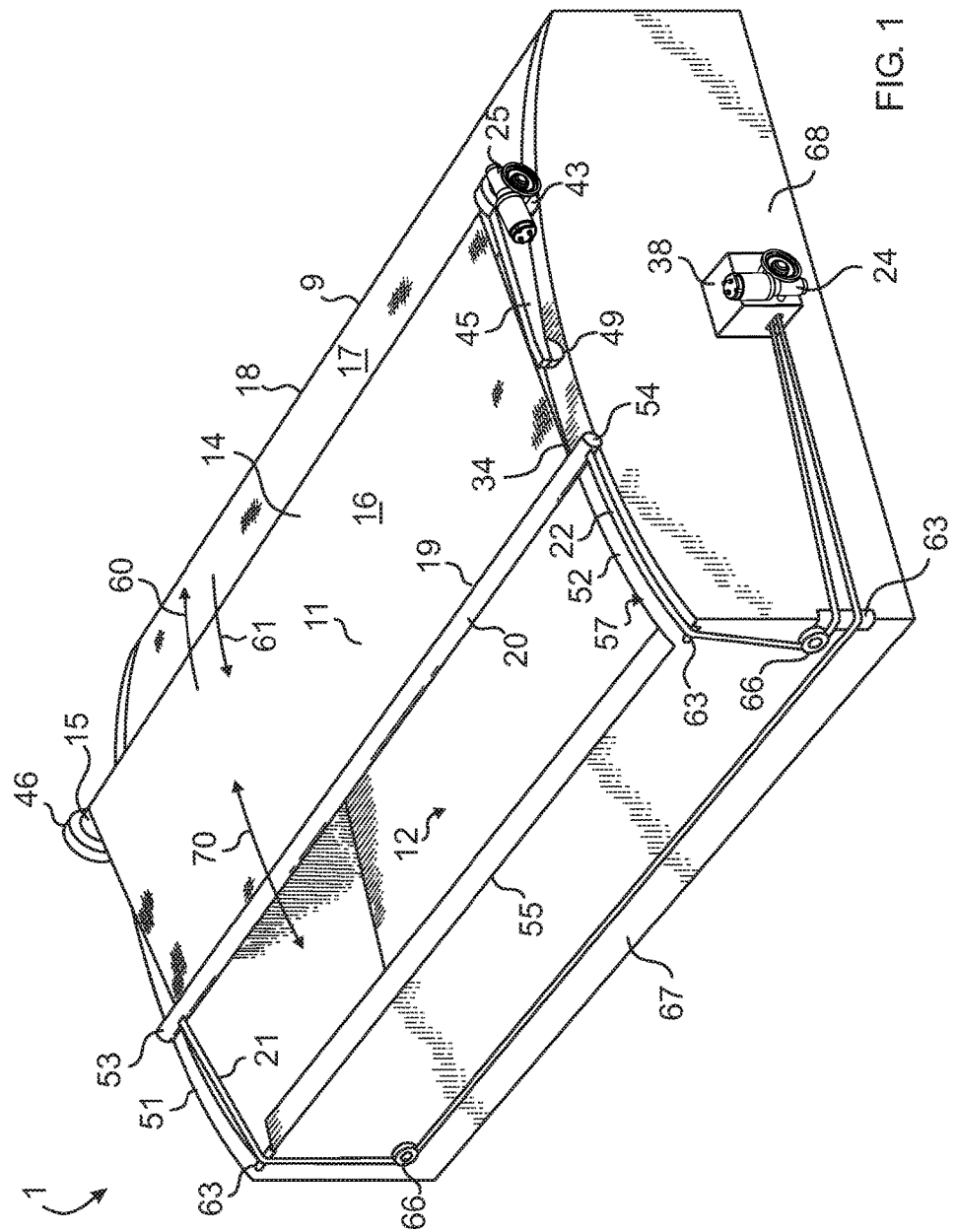
FIG. 1 is a diagrammatic perspective view of the canopy mechanism having dedicated deployment and retraction electric motors.
Figure 2:
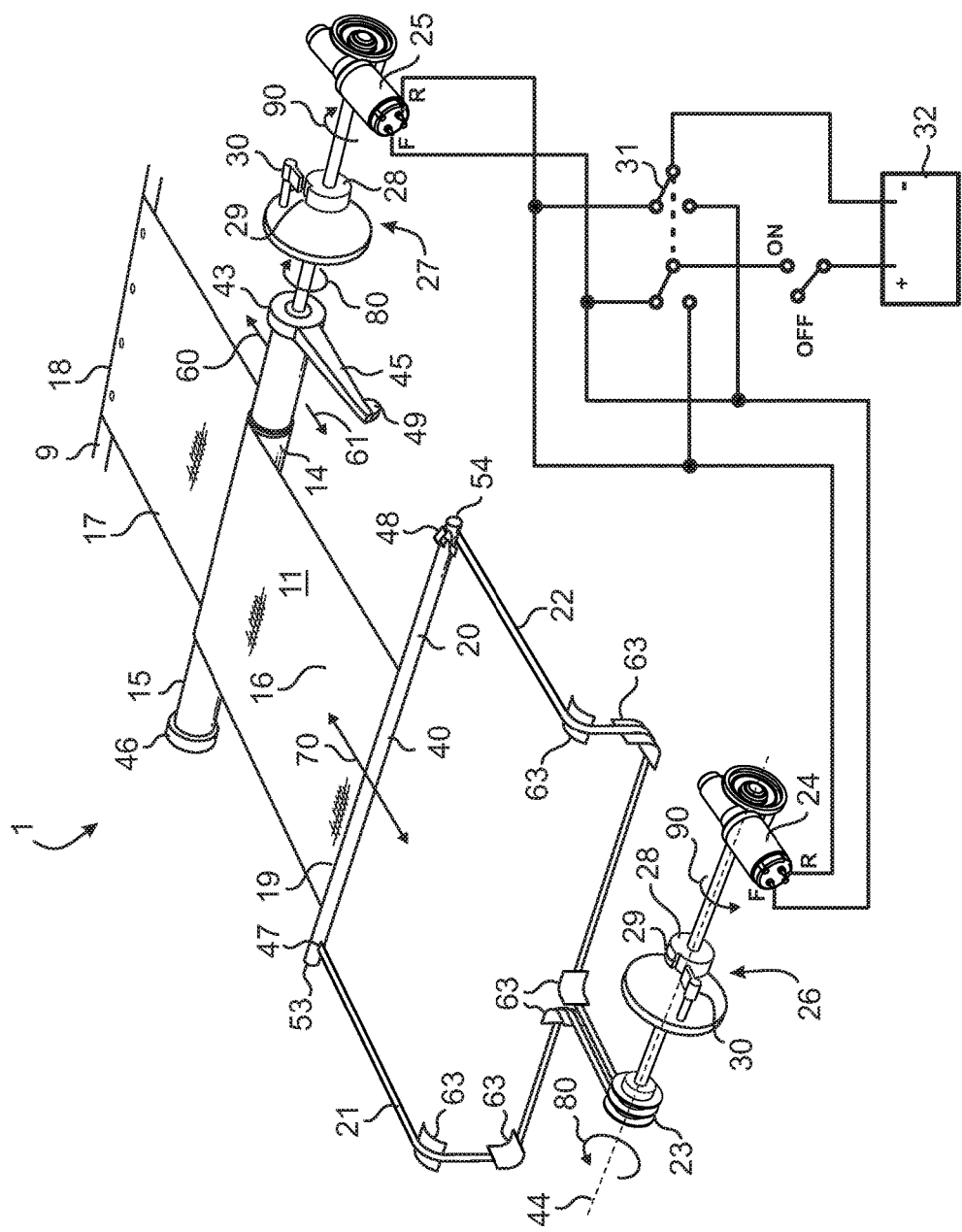
FIG. 2 is a diagrammatical illustration of the non-free-wheeling electric motor canopy deployment mechanism according to an exemplary embodiment of the invention.

Referring now to the drawing, there is illustrated in FIGS. 1-2 the basic operation of the canopy deployment and retraction mechanism 1 according to an exemplary embodiment of the invention.

The canopy 11 includes a fabric tarp made of a durable, flexible sheet material which is deployable over the cargo area 12 of a truck, trailer, or wagon. The median section 14 of the canopy is attached to a spindle in the form of a translatable roller 15, whereby when the roller is rotated in a retracting direction both half-sections 16, 17 of the canopy astride the median section are taken-up and wound-up together as the roller translates 60 toward the stationary end 18 of the canopy secured to one side rim 9 of the cargo area, and translates 61 toward the opposite rim 55 when the canopy is unwound.

The opposite and free leading edge 19 of the canopy 11 is secured to a pull-rod 20 which courses 70 over the open top of the compartment and the opposite side rim 55 of the cargo area. The opposite extremities 53,54 of the pull-rod are supported on the opposite front and back rims 51,52 of the cargo area which are formed to have mutually parallel and convex rounded upper surfaces 57 that form arcuate tracks for the extremities of the pull-rod and the ends of the roller.

Figure 3:
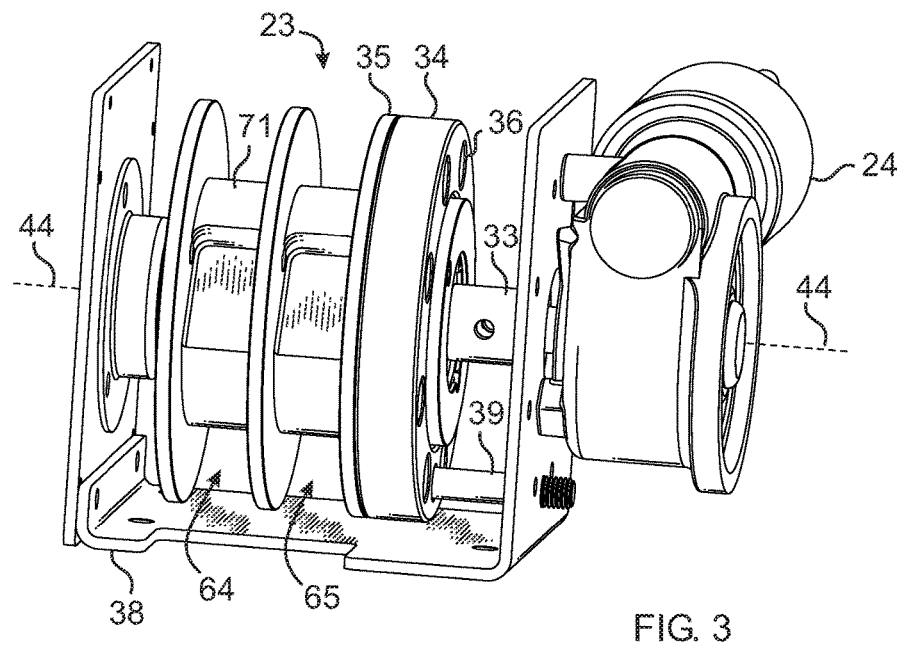
FIG. 3 is a perspective view of the spool assembly.

The opposite extremities 53,54 of the pull-rod are connected to a pair of straps 21, 22 which course along the front and back rims 51,52 of the cargo area and over a number of direction altering, gradually curving guides 63. The free ends of the straps are wound-up on a spindle in the form of a dual-reeled spool 23, as shown in more detail in FIGS. 3-5, so that each strap is wound upon a separate, cooperating, coaxial reels 64,65 within the spool to avoid fouling and to provide greater control of how much of each strap is taken up in its dedicated reel during a given revolution of the spool. The straps can connect to the pull rod through a substantially permanent connection 47, or an adjustable connection 48. An adjustable connection is preferred when the connection between the straps and spool is less accessible or adjustable.

Thus the material being wound on the spool can be strap material, while the material being wound upon the roller can be tarp material.

The spool 23 is driven by a first non-freewheeling DC motor 24 operating at 12 or 24 volts and a standard operating range of between about 20 to 60 amperes but which can briefly go as high as 180 amperes. To be non-freewheeling the motor includes a worm gear transmission which prevents movement of the motor drive shaft due to load-derived torque. In other words, in a non-free-wheeling motor there is substantially no motor shaft movement unless the motor is energized in the forward or reverse direction. A similar, second DC motor 25 similarly drives the canopy-retracting roller 15. The use of non-freewheeling motors allows the deployed canopy to be firmly held in place while both motors remain de-energized. Such non-freewheeling DC electric motors are relatively inexpensive and are commercially available from Superwinch, LLC of Dayville, Conn.

The first motor 24 can be coupled to the canopy deployment spool 23, rotatably carried within a protective housing 38, by means of a first ratchet gear 26. The second motor 25 can be coupled to the roller 15 by means of a second ratchet gear 27. Each ratchet gear can have a wheel 28 associated with the motor including a single peripheral indentation 29 that is engaged by a spring-biased pawl 30 associated with the spool or roller when the motor runs in its forward, either deploying or retracting direction as indicated on each motor by an arrow 90. When a motor runs in reverse direction, the pawl stays engaged so long as its spindle is being pulled to let out material. When the reverse direction motor turns faster than the material of its associate spindle is being pulled out, the pawl disengages its indentation and rides over its wheel. In other words, in the unwinding direction, either motor can turn faster than its associated spindle turns. Thus the ratchet gear intermittently disengages the unwinding motor from its unwinding spindle.

The single indentation provides an easily manufactured, rugged, heavy-duty ratchet particularly useful in the rugged environment of cargo trucks. It also allows an amount of free play of the gear of potentially up to approximately 360 degrees before the pawl engages. Accordingly, the spool 23 or the roller 15 can be subject to delayed engagement of the motor while it powers up to speed. This helps to lower the peak current drawn on the motor when it starts up under load.

The motors are preferably run in opposite directions from each other so that the unwinding motor essentially determines how much material is being transferred. When the unwinding motor turns more quickly than the amount of material is being wound by the winding motor, the unwinding motor begins to ratchet. This can continue until the winding motor takes up enough material to "catch-up". On the other hand, when the winding motor attempts to take up more material than the unwinding motor is giving out, the unwinding motor prevents the winding motor from turning as quickly as it wants helping to keep the material taut and aligned. A double pole, double throw switch 31 reverses the polarity of the current drawn from a battery 32 and applied to the motors; thus simultaneously reversing the respective directions of the motors.

As illustrated in FIGS. 1-5, the spool 23 is rotatably mounted on an axle 33 coupled to the first motor 24 through a first ratchet gear 26 formed into the hub 71 of the spool.

Thus the spool and axle can rotate about a common axis 44. A constantly engaged circular friction enhancing element or brake 34 axially surrounds the axle in a concentric arrangement and in close proximity to axially contact a lateral flange 35 of the spool.

Figure 4:
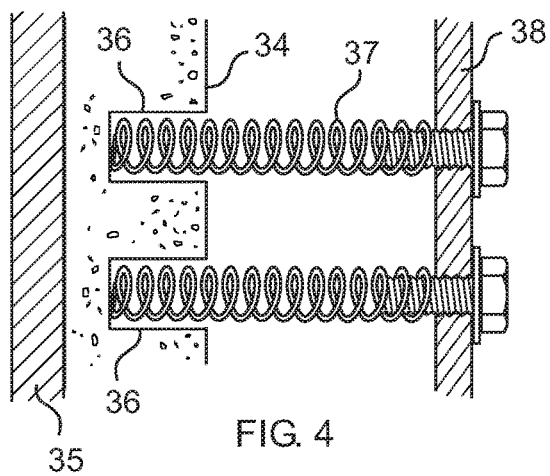
FIG. 4 is a diagrammatical, partial cross-sectional view of the spool brake.

Referring primarily to FIG. 4, each of a plurality of cavities 36 in the cylindrical brake holds a plurality of springs 37 bearing against the spool frame housing 38 for biasing the brake against the outer surface of the flange 35. The frictional contact between the brake and the flange provides a braking action on the spool which causes the ratchet to disengage and allow the first motor to spin in the reverse, unwinding direction without causing the spool to give out more strap than is being taken up through the winding of the tarp. In other words, the amount of strap unwound off the spool is controlled by the amount of tarp being wound by the roller under power of the second motor. In this way there is no over-unwinding of the spool even though the first motor spins freely in the unwinding direction. The brake is angularly fixed with respect to the frame 38 of the spool assembly by a bolt 39 but is allows to translate axially. Due to the larger inertia of the roller, a brake is typically unnecessary on the roller.

Figure 5:
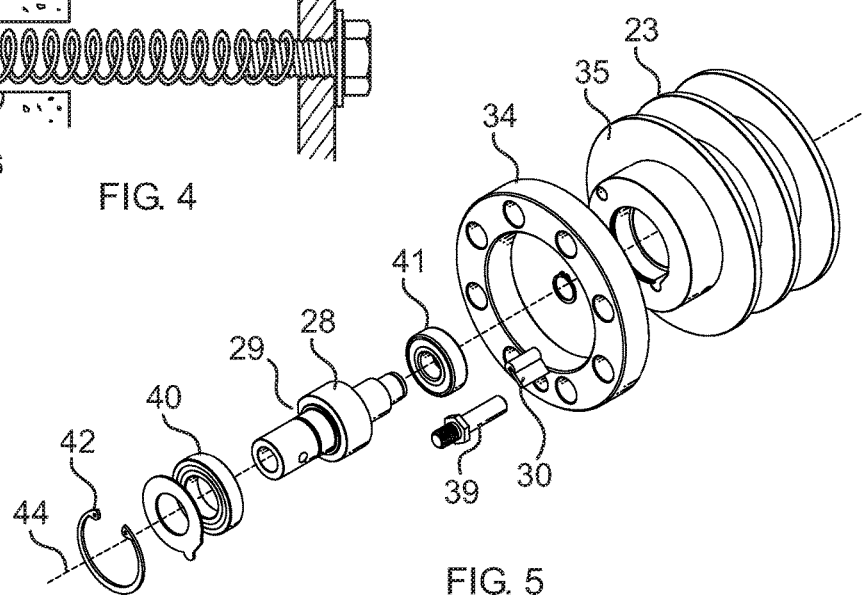
FIG. 5 is an exploded view of the spool assembly.

The exploded view of the spool assembly in FIG. 5 illustrates is various components previously described and its bearings 40, 41 and lock washer 42.

Referring primarily to FIG. 1, the second motor 25 can be mounted on a sled 43 that rides on an arcuate first track formed by the front and back rims 51,52 spanning the cargo area 12. The curved track can help create a better seal against water when the canopy is deployed. A stabilizing arm 45 has a distal pad 49 which slidingly bears on the track and provides a torquing anchor for the motor. The pad's contact surface can be made from rigid plastic or other durable low-friction material. The opposite end 46 of the roller can terminate in a wheel which can roll across a similar second track 51 parallel to the first along the opposite rim of the cargo area. Alternately, a second similar stabilizing arm can be provided on the opposite end.

Although the opposite front and back rims 51,52 of the cargo area are often formed to have mutually parallel and convex rounded upper surfaces to help ensure a weather-proof seal when the tarp is fully deployed, the above system can be readily adapted to cargo areas having flat upper surfaces.

The straps can contact and slide against the track formed on the front and back rims as shown on the strap 22 running along the back rim 52, or alternately the straps can run off the track inside the rim as shown on the strap 21 running along the front rim 51. Alternately, direction altering pulleys 66 can be used instead of one or more of the guides and result in somewhat less wear on the straps. However, guides have proven less prone to fouling and do not appreciably increase the wear on the inexpensively replaced straps. It should be noted that although the first motor and spool housing is shown located on the outer surface 67 of the cargo container side wall, it can be conveniently mounted to the container end wall 68 or even under the container and the straps routed accordingly in order to better protect the motor and housing.

In this way the mechanism can operate in absence of expensive and efficiency-robbing stabilizing gears or levers to guide the movement of the canopy. Further, the gearing of the motors can be selected so that the spool motor winds more rapidly such as through using 60:1 gear ratio than the roller motor using a 90:1 gear ratio. Alternately, by increasing the spool diameter, both motors can be substantially identical, meaning both motors can be of a single manufacturing model and can be swapable such that either motor can be used as the deployment motor or the retraction motor.

Although the system has been shown to make use of relatively inexpensive, non-freewheeling, DC electric motors, other types of motors can be used and take advantage of the automatic alignment capability of the direction reverseable ratcheted motors. For example, air and hydraulic motors can be used without as much concern for motor synchronization.

Referring now to FIGS. 6-15, there are shown exemplary embodiments of an electronic motor energy burn-out avoidance system. For clarity, the system is primarily shown as adapted for use with a single electric motor. However, it shall be understood that the burn-out avoidance system can be readily adapted and implemented to control the powering of two or more motors used in the above described canopy deployment and retraction system. Indeed, by providing enhanced motor energy usage protection in combination with the above-described ratcheting system, less expensive motors can be reliably used.

Figure 6:
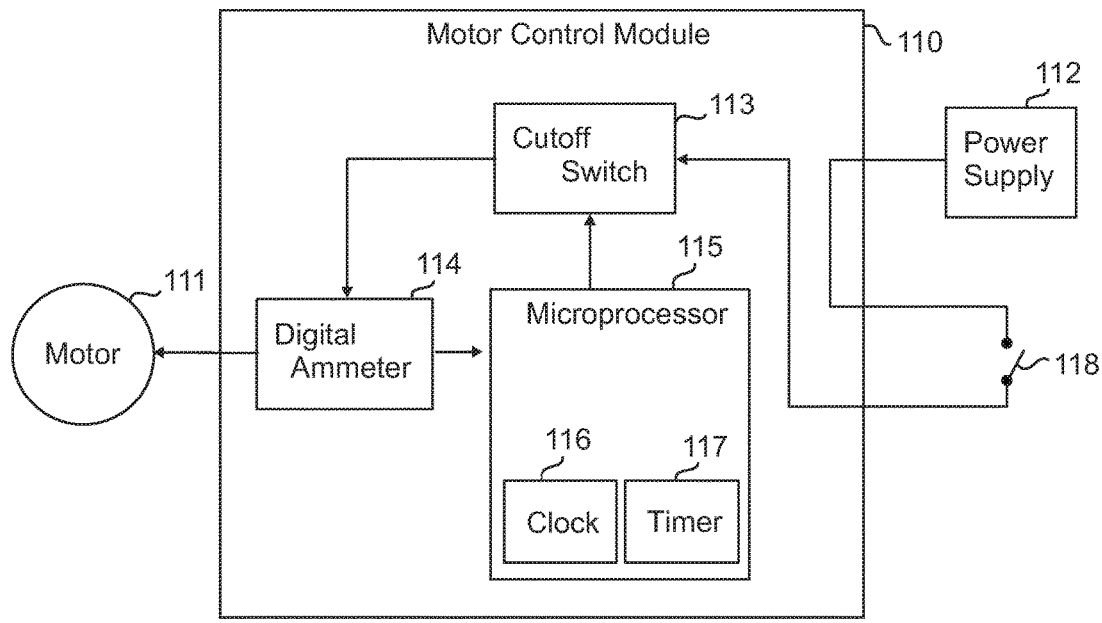
FIG. 6 is a block diagram of an exemplary power control system for an electrical motor canopy deployment and retraction system.

As shown in FIG. 6, a cargo canopy system electrical motor 111 is protected against a burn-out due to excessive use of energy. The output of an electrical power supply 112 to be applied to the motor is run though an electronic motor control module 110 which can activated by a manual on/off switch 118. The motor control module can include an automatic programmed cutoff switch 113 that can be tripped when what is deemed excessive power has been drawn by the motor. A digital ammeter 114 can be located in series between the power source and the motor. The cutoff switch 113 and ammeter are under the control of a microprocessor 115 equipped with a clock 116 and a timer 117.

Figure 7:
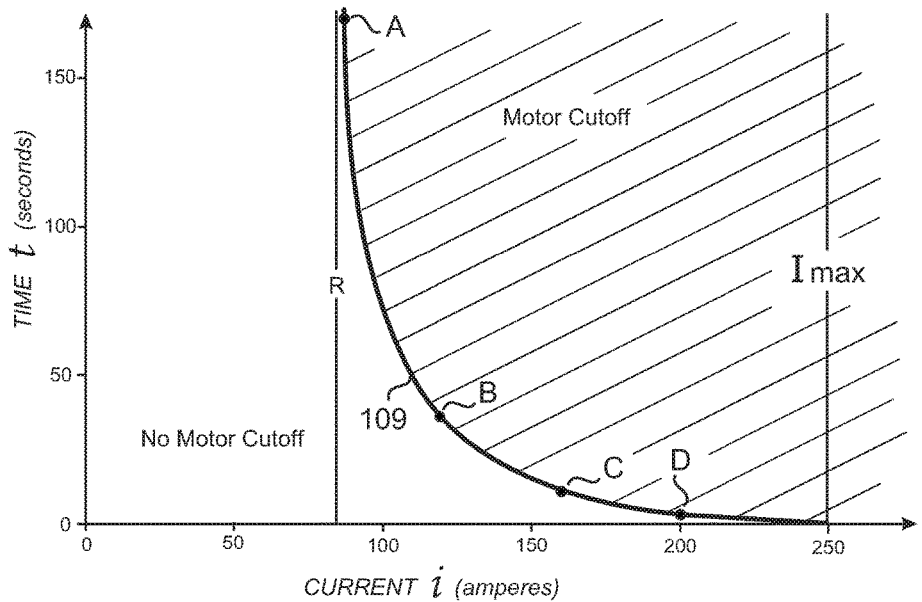
FIG. 7 is a graph of an exemplary acceptable time versus current function for a typical cargo canopy system motor.

The given overloading tolerances of the motor 111 are displayed on the graph of FIG. 7. The x-axis indicates the amount of current i in amperes measured by the ammeter 114, and the y-axis indicates time t in seconds that the motor has been supplied the measured current. The curve 109 indicates the maximum time the motor can safely run at the measured current. Thus any conditions plotted in the shaded area above and to the right of the curve on the graph would indicate a "Motor Cutoff" condition, whereas conditions plotted in the unshaded area below and to the left of the curve indicate a "No Motor Cutoff" condition. The vertical Imax line indicates the maximum current allowable above which the motor power is cut off regardless of how long that current has been applied. Current levels lower than that indicated by vertical line R will be allowable with no motor cut off regardless of how long that current has been applied. Thus current levels falling between these extremes can be said to be a dangerous level of operation.

For the sake of explanation, a number of useful and critical current levels and corresponding maximum running times are highlighted on the graph, to wit:
Point A: 80 amperes—160 seconds;
Point B: 110 amperes—40 seconds;
Point C: 160 amperes—10 seconds;
Point D: 200 amperes—0.5 seconds.

These values can be used to set a number N of trip points TP(n) for the system as follows:

| Trip Point: TP(n) | Current: I(n) | Time Limit: T(n) |
|---|---|---|
| TP(1) | 80 A | 160 s |
| TP(2) | 110 A | 40 s |

| Trip Point: TP(n) | Current: I(n) | Time Limit: T(n) |
|---|---|---|
| TP(3) | 160 A | 10 s |
| TP(4) | 200 A | 0.5 s |

In this case N=4 so that there are 4 trip points.

Thus each of the trip points includes an assigned threshold amperage for the current drawn by the motor and an associated time duration limit.

Figure 8:
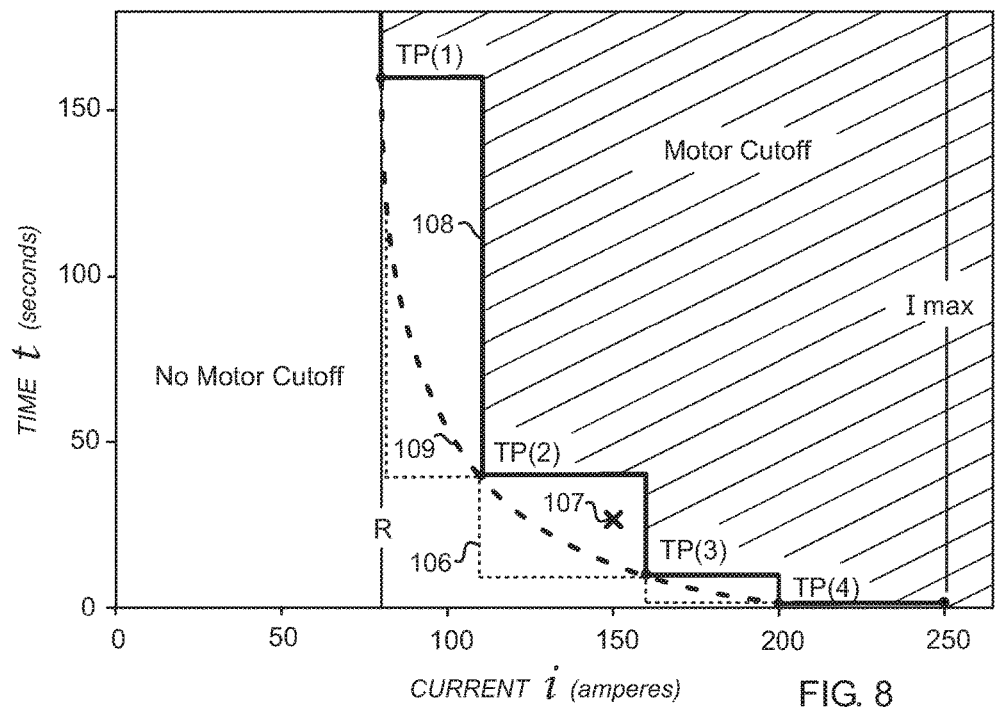
FIG. 8 is a graph of an exemplary power cutoff process having a plural number of preset trip points.

Referring now to FIG. 8, there is shown a graph plotting the predetermined trip points TP(n) including their current levels I(n) and their assigned maximum running times T(n) to determined whether the power supplied to the motor should be turned off.

Figure 10:
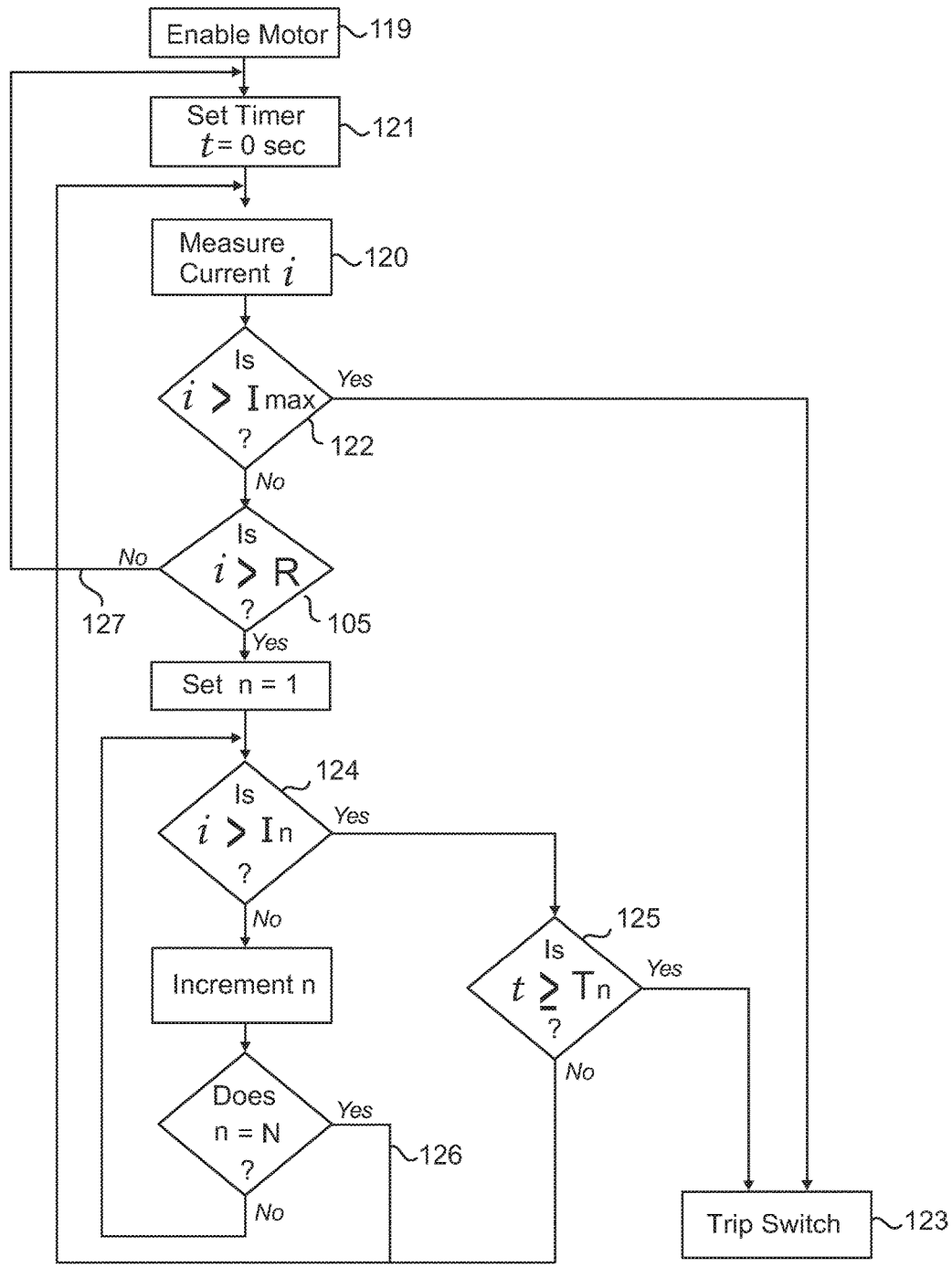
FIG. 10 is a flow diagram of a motor overload protection process according to a first exemplary embodiment of the invention.

Referring now primarily to FIGS. 6 and 10, as soon as the motor ill has been enabled. 119 or switched on by closing switch 118, the timer 117 is started 121, and the digital ammeter 114 takes a measurement 120 of the current being supplied i. The microprocessor 115 immediately verifies 122 that the current does not exceed the maximum level Imax that can be tolerated. In this case Imax is set to 250 A. If the measured current does exceed Imax, the switch 113 is tripped 123. The micro processor also verifies that the current does exceed 105 the minimum current level R where cutoff is possible. If the measured current does not exceed the minimum current level R, the process loops back 127 to reset the timer and take a new current measurement. If not, the microprocessor then runs through each of the programmed trip points TP(n) to determine 124 whether the measured current i is greater than the threshold current I(n) for that trip point. If the measured current is lower than the threshold for all the trip points, the process loops back 126 to measure the current again 120, and the process repeats.

If, on the other hand, the measured current i is greater than the threshold current I(n) of one of the trip points, the process checks 125 the elapsed time t that the motor has been enabled. If the elapsed time t is greater than or equal to the corresponding trip point time limit T(n), the cut off switch 113 is tripped 123. If the elapsed time has not yet reached the trip point time limit T(n), the process loops back to measure the current again 120, and the process repeats.

Referring primarily now to FIG. 8, it shall be noted that the above process results in a step function 108 where there is a coarseness to the defined conditions such that currents measured above a particular trip point that have not yet attained the level of the next successive trip point could present a damaging situation. This is particularly trite where the trip point threshold current and elapsed time values fall on the curve 109 indicating the maximum time the motor can safely run at the measured current. In other words, for example, as shown in the graph of FIG. 8, a condition where the motor has been supplied a current of 150 A for 25 seconds 107 would result in a non trip condition which falls above and to the right of the curve.

Ultimately, the trip point values can be adjusted, or more trip points added to overcome the problem. In this way the trip points can be selected dynamically from a continuous range of selectable amperages falling between the minimum current for possible cutoff and maximum allowable current. For example, the trip point values can be selected to result in a step function which falls below and to the left of curve 109 as shown by, the finely dotted lines 106 FIG. 8. The trip point values can be assigned by shifting the elapsed time values to the next lower trip point. Thus:

| Trip Point: TP(n) | Current: I(n) | Time Limit: T(n) |
|---|---|---|
| TP(1) | 80 A | 40 s |
| TP(2) | 110 A | 10 s |
| TP(3) | 160 A | 0.5 s |
| TP(4) | 200 A | 0 s |

One drawback of the above process would be that a trip occurs in a non-damaging situation.

Figure 9:
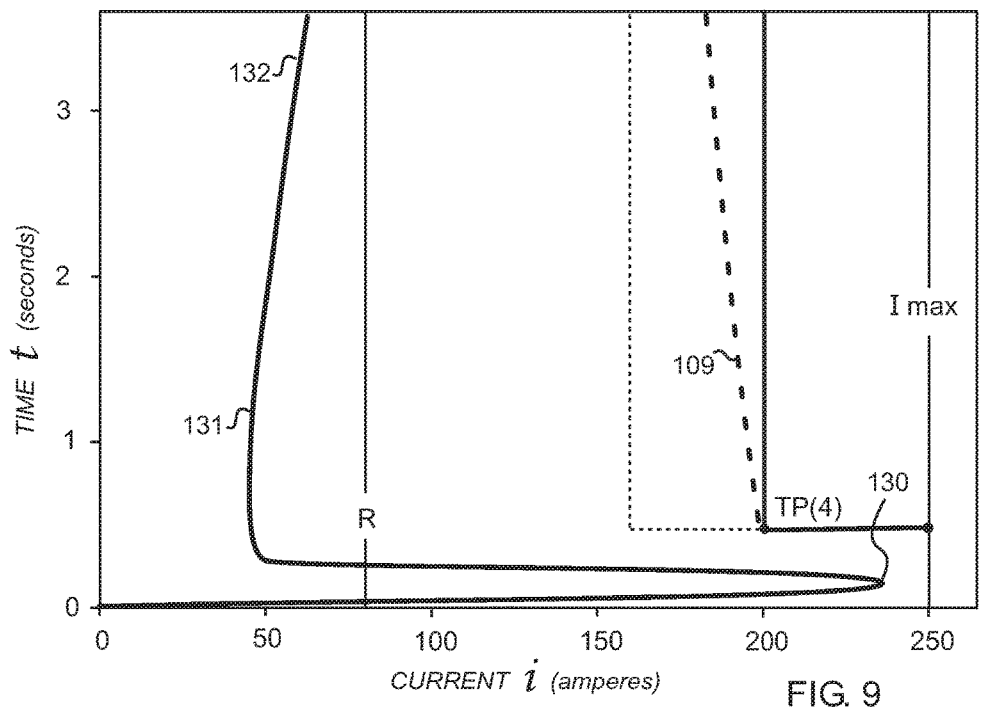
FIG. 9 is a graph of an exemplary current usage over time by a typical cargo canopy system motor.

Further, admittedly, the routine of FIG. 10 can potentially result in a late cutoff of the motor if the current drops after a significant time has elapsed in which the current had been higher. However, it has been found, as shown in the graph of FIG. 9, that in most tarping situations, there is an initial current spike 130 due to the higher torque required to overcome the inertia of an at-rest, fully loaded roller. Thereafter, the supplied current essentially levels off 131 at a much lower acceptable value. Indeed, it has been found that the supplied current tends to creep upward 132 over time, and that the most potentially damaging situation is when there is a late current increase. The above routine would address this situation adequately.

Figure 11:
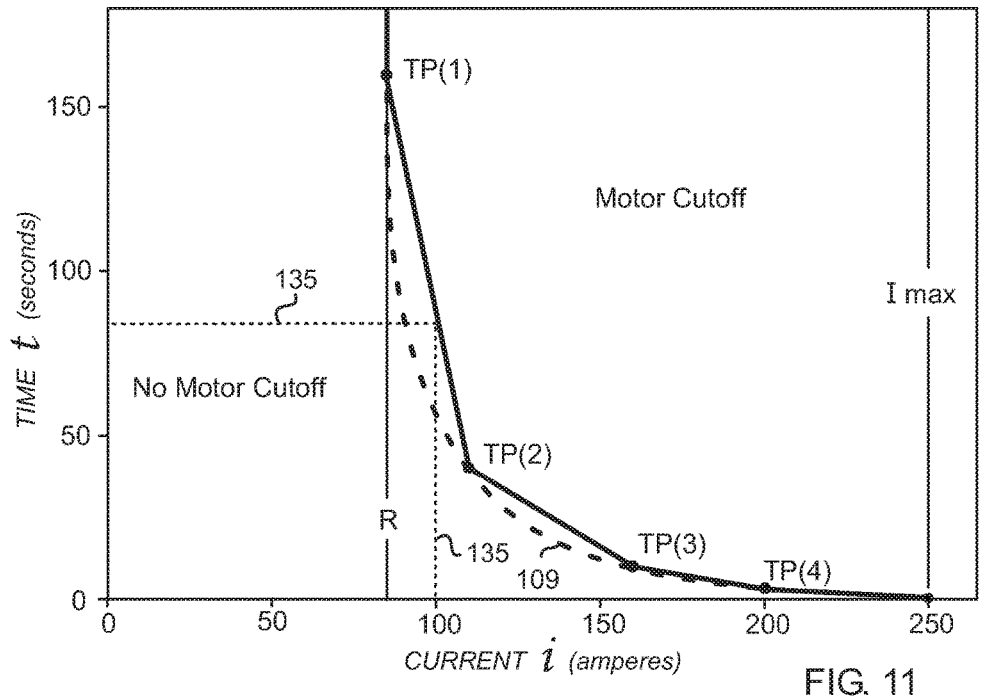
FIG. 11 is a graph of an exemplary power cutoff process having a plural number of preset trip points and linearly interpolated interconnecting intervals.

Referring now to FIG. 11, there is shown an alternate graph showing linearly interpolated time cutoff conditions for those situations where the measured current falls between a pair of trip point currents. The cutoff time tco is calculated to be tco=$T_n$+(i−$I_{n+1}$)[($T_{n+1}$−$T_n$)/($I_{n+1}$−$I_n$)]. For example, as shown by the finely dotted lines 135, a measured current of 100 A would have an elapsed time cutoff linearly interpolated to be 80 seconds. It shall be noted that in the above test $I_{(N+1)}$ can be assigned Imax, and $T_{(N+1)}$ can be assigned zero seconds. Further, when the current is below I(1) and tco does not exist, the test is not run.

Figure 12:
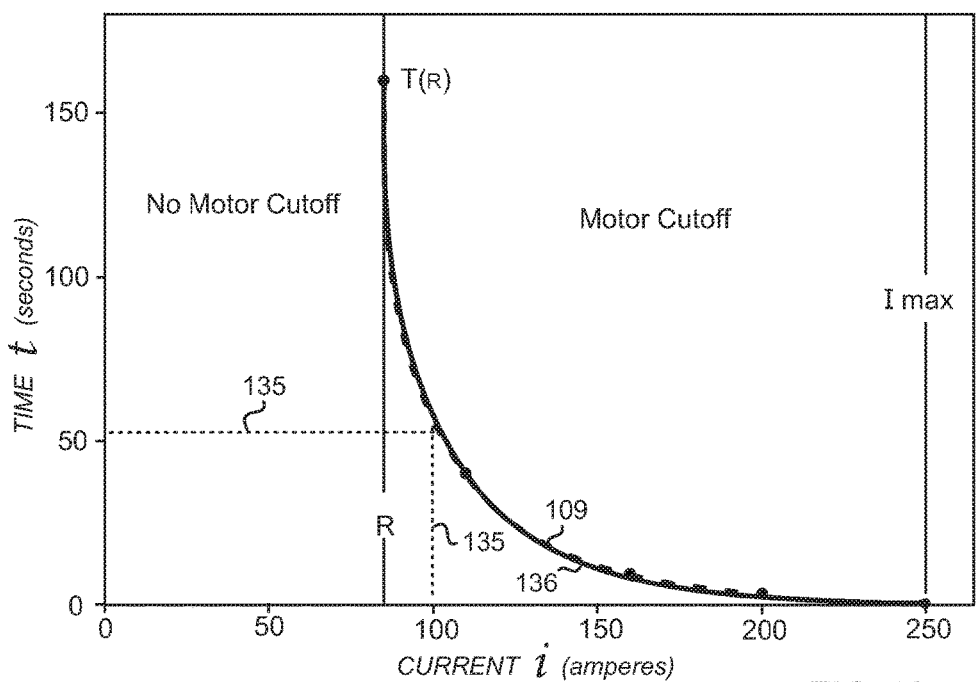
FIG. 12 is a graph of an exemplary power cutoff process having a plural number of preset trip points and polynomially interpolated interconnecting intervals.

Referring now to FIG. 12, more accurate methods of curve matching are available using polynomial interpolation or mathematical splines such that the elapsed time cutoff for any steady measured current could be determined essentially from an equation modeling the motor's maximum current curve 109. When plotted that equation can result in a curve 136 which closely matches the motor's maximum current curve.

For example, the modeling equation may be a function of time of the type:

$$L(t)=[(Imax-R)/(t^2+1)]+R$$

Alternately, the modeling equation can be a partial function of measured current i so long as the range falls between the minimum current level R and the maximum current level Imax.

For example, the modeling equation may be defined between the limits of R and Imax as a quadratic function of current of the type:

$$L(i)=ai^2+bi+c$$

where L(Imax)=0, and a, b and c, as well as R and Imax are specific to the motor.

Figure 13:
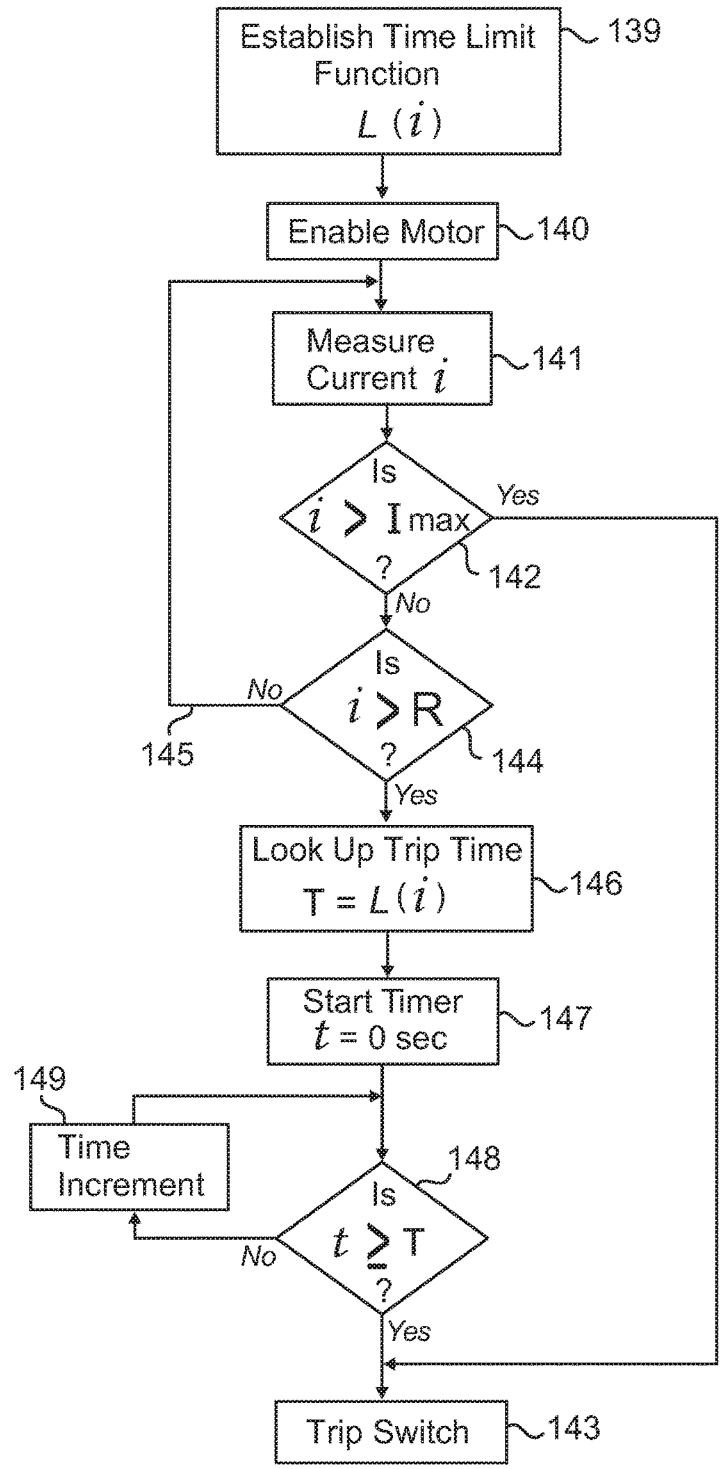
FIG. 13 is a flow diagram of a motor overload protection process according to an alternate exemplary embodiment of the invention calculating a cutoff time based on a continuous function of current.

Referring now to FIG. 13, the microprocessor establishes 139 a maximum time limit function L of current as illustrated in the graph of FIG. 12. This function can be generated and stored in the microprocessor memory, or it can be generated at the time the manual on/off switch is closed. In this way, optionally, the motor characteristics may change based on environmental temperatures and thus the function or its defined limits can change or otherwise adapt to given conditions. Thus some measured parameters such as environmental temperature can accounted for in the equation.

As soon as the motor 111 has been enabled 140, the digital ammeter 14 takes a measurement 141 of the current being supplied i. The value of the measured current is tested 142 to verify whether it has exceeded the maximum allowable current Imax. If so, the cut off switch is tripped 143. If not, the value of the measured current is tested 144 to verify whether it has exceeded the minimum current level R where cutoff is possible. If not, the process loops back 145 to measure the current again 141, and the process repeats. If, on the other hand, the measured current i exceeds the minimum current level R, the microprocessor computes 146 the value of corresponding maximum tolerable time T of motor operation as a function L of the measured current i and the timer 117 is started 147. As the elapsed time t increases 149, the microprocessor verifies 148 whether the elapsed time has passed that maximum tolerable time. When the timer indication t reaches the value T, the breaker switch is tripped 143. Of course if the motor is shut off, the process stops.

Accordingly, as soon as the current drawn by the motor exceeds the rated level R the device of the invention closely monitors the time the motor runs at the excessive current. When the absolute time limit plotted on the graph 136 is reached, the device interrupts the electrical power feeding the motor, thus saving the motor from a costly burn-out.

Figure 14:
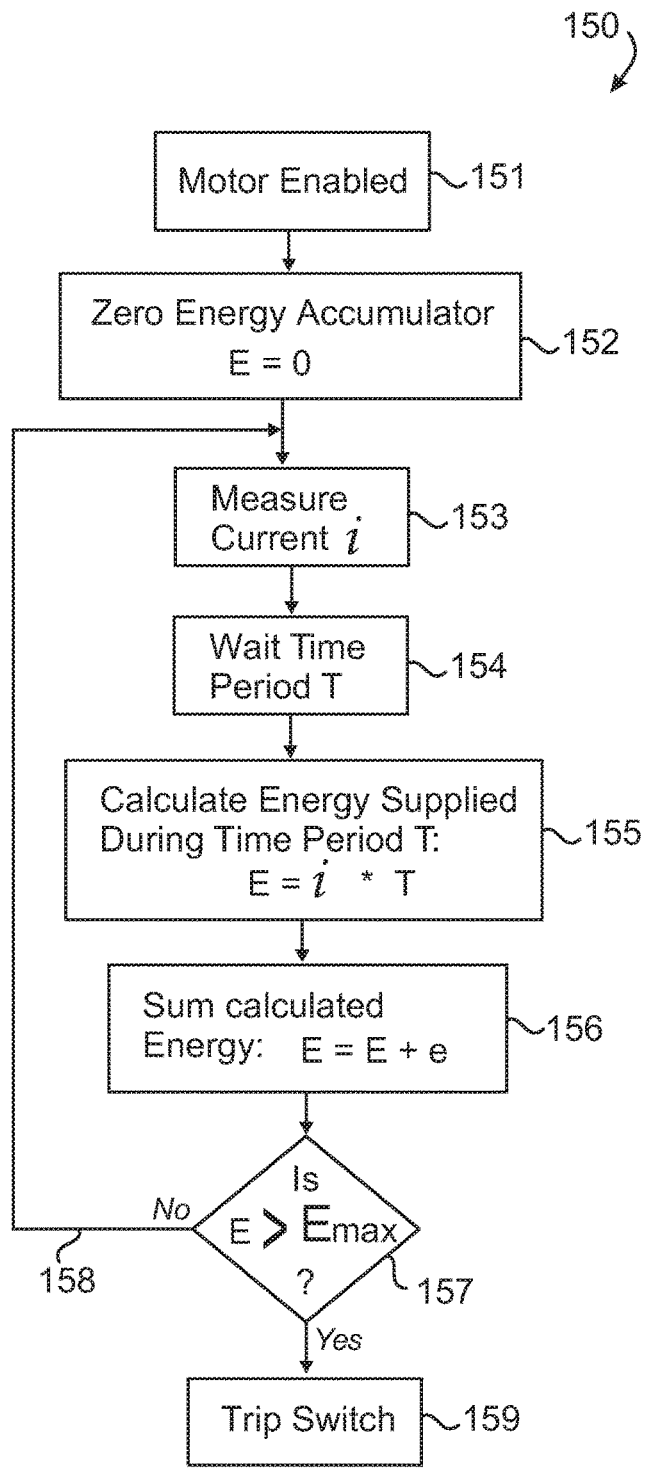
FIG. 14 is a flow diagram of a motor overload protection process according to another alternate exemplary embodiment of the invention using an accumulated energy register.

Referring now to FIG. 14, an alternate process 150 tracks the amount of energy consumed by the motor during any continuous operation of the motor. Once the motor is enabled 151 an energy accumulator variable E is zeroed 152. The current i is then measured 153 and a short time period T, such as 0.5 second, is waited 154. The energy consumed e during the short time period is calculated 155 according to the equation e=i*T. This energy is accumulated 156 in the energy register according to the sum E=E+e. The process then verifies 157 whether the accumulated energy E has exceeded the maximum allowable energy Emax. If so, the switch is tripped 159 to out off power to the motor. If not, the process loops back 158 to measure the current again, and repeat the test.

An advantage of the above system is that a reversing polarity function for driving the solenoid of the motor can be implemented so that motor jams can be more easily freed.

Another advantage of the system is the microprocessor can be adapted to control two or more motors of the same or different types. For example, in the deployment system of FIGS. 1-5 it has been found that the deployment motor 24 can have a gear ratio of approximately 60:1 while the retraction motor 25 can have a gear ratio of approximately 90:1. The motor control module can be programmed for different energy cut off conditions for each motor. Further the motor control module can be further adapted to apply the forward or reverse polarity to energize the reversing solenoids in the motors and thus drive the motors in the appropriate directions.

In some systems the retraction motor can get more work than the deployment motor.

In this way there is provided a simple device that can fulfill the motor burnout avoidance function by measuring the amount of power drawn by a motor and interrupting that power when it becomes excessively dangerous for the motor, rather than responding immediately to a short spike in the amplitude of the electrical current.

Further the system allows for the use of a wide range of electric motors having a range of performance characteristics.

While the preferred embodiment of the invention has been described, modifications can be made and other embodiments may be devised without departing from the spirit of the invention and the scope of the appended claims.

What is claimed is:

1. An apparatus for disabling an electric motor when the amount of energy consumed by the motor exceeds a preset limit, said apparatus comprises:
   an electrical power source;
   an electrical motor;
   an electronic motor control module which comprises:
      a digital ammeter in series between said electrical power source and said electrical motor;
      a programmable microprocessor accepting an output of said digital ammeter;
      a power cutoff switch responsive to a motor cutoff signal from said microprocessor for cutting off power to said motor;
   wherein said microprocessor generates said motor cutoff signal in response to a program running on said microprocessor;
   wherein said program comprises:
      a plurality of threshold amperages for an electric current drawn by said motor;
      a time duration limit for each of said plurality of threshold amperages;
      a measurement of the amperage of the current drawn by the motor to get a measured current;
      an instruction detecting that said measured current has exceeded a first one of said threshold amperages and not exceeded a next larger one of said threshold amperages;
      a timer accumulating the time said measured current is drawn; and
      an instruction generating said motor cutoff signal when said time duration limit for said first one of said threshold amperages is reached.

2. The apparatus of claim 1, wherein said program further comprises:
   program instructions for setting said time duration limit for each of said plurality of threshold amperages by procuring a time-versus-current function expressing the maximum time values of excessive current that may be safely drawn by said motor; and,
   generating said motor cutoff signal when a maximum time of flow for a measured current exceeds a corresponding maximum time value given by said function.

3. The apparatus of claim 1, wherein said program further comprises:
   program instructions for comparing said amperage to a preset maximum current limit; and switching off said motor when said limit is exceeded.

4. The apparatus of claim 1, wherein said measurement of the amperage occurs continuously.

5. The apparatus of claim 1, wherein said program further comprises:
   program instructions for subsequently detecting that said measured current exceeds said next larger one of said threshold amperages; and, interrupting said supply when said limit for said next larger one of said threshold amperages reached without resetting said accumulated time.

6. The apparatus of claim 1, wherein said program further comprises:
   program instructions for assigning at least three of said plurality of threshold amperages from a continuous range of selectable amperages falling between a minimum current for possible cutoff and a maximum allowable current.

7. The apparatus of claim 1, wherein said motor is used to translate a canopy over a cargo compartment.

8. The apparatus of claim 7, which further comprises:
said motor being a first non-freewheeling motor driving a spool winding up a strap secured to the leading edge of the canopy;
a second non-freewheeling motor driving a canopy take-up roller; and
coupling said first motor to said spool via a first ratcheting gear.

9. The apparatus of claim 8, which further comprises coupling said second motor to said roller via a second ratcheting gear.

10. The apparatus of claim 8, which further comprises a braking action a brake acting upon the spool.

11. The apparatus of claim 8, wherein the first non-freewheeling motor is run in reverse rotation during retraction of the canopy.

12. The apparatus of claim 11 which further comprises a first ratchet gear intermittently disengaging the spool from the first non-freewheeling motor during reverse rotation as the canopy is being retracted.

13. The apparatus of claim 12, wherein the second non-freewheeling motor is run in reverse rotation during deployment of the canopy.

14. The apparatus of claim 13 which further comprises a second ratchet gear intermittently disengaging the second motor during reverse rotation as the canopy is being deployed.

15. The apparatus of claim 8, wherein the canopy take-up roller is connected to a median portion of the canopy and is rotated to take up and wind together both straddling sections of the canopy; and said mechanism further comprises:
a track spanning one end of the cargo area, said track supporting the second motor; and
a motor-stabilizing torque arm riding on said track.

16. The apparatus of claim 8, which further comprises:
said strap being a first strap which comprises:
a first distal portion connected to said leading edge; and
a first proximal portion wound-up on said spool; and,
a second strap which comprises:
a second distal portion connected to said leading edge; and
a second proximal portion wound-up on said spool.

17. The apparatus of claim 16, wherein each of said first and second straps are wound upon separate cooperating reels of said spool.

* * * * *